United States Patent
Haddad et al.

(10) Patent No.: US 9,154,378 B2
(45) Date of Patent: *Oct. 6, 2015

(54) ARCHITECTURE FOR VIRTUALIZED HOME IP SERVICE DELIVERY

(71) Applicant: Telefonaktiebolaget L M Ericsson (publ), Stockholm (SE)

(72) Inventors: Wassim Haddad, San Jose, CA (US); Joel Halpern, Leesburg, VA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,803

(22) Filed: Jun. 2, 2014

(65) Prior Publication Data

US 2014/0286348 A1 Sep. 25, 2014

Related U.S. Application Data

(63) Continuation of application No. 13/271,056, filed on Oct. 11, 2011, now Pat. No. 8,812,670.

(51) Int. Cl.
*H04L 12/28* (2006.01)
*H04L 12/24* (2006.01)
(Continued)

(52) U.S. Cl.
CPC ........ *H04L 41/0816* (2013.01); *H04L 12/2807* (2013.01); *H04L 12/2832* (2013.01); *H04L 12/2834* (2013.01); *H04L 63/08* (2013.01); *H04W 12/06* (2013.01); *H04L 2012/5618* (2013.01); *H04W 84/12* (2013.01)

(58) Field of Classification Search
CPC ............................. H04L 12/2834; H04L 63/08
See application file for complete search history.

(56) References Cited

U.S. PATENT DOCUMENTS

| 5,956,323 | A | 9/1999 | Bowie |
| 6,631,416 | B2 | 10/2003 | Bendinelli et al. |

(Continued)

FOREIGN PATENT DOCUMENTS

| EP | 1562390 | 8/2005 |
| WO | WO-2009030282 | 3/2009 |

OTHER PUBLICATIONS

Non-Final Office Action, U.S. Appl. No. 13/271,047, dated Feb. 13, 2013, 15 pages.

(Continued)

*Primary Examiner* — Jimmy H Tran
(74) *Attorney, Agent, or Firm* — Nicholson De Vos Webster & Elliott, LLP

(57) ABSTRACT

A method implemented by a network element of an Internet service provider to provide network access through a visited network associated with a visited network owner to a device of a visiting user connecting to the visited network. The visited network owner is a customer of the Internet service provider. The network element configures the visited network to provide access to resources of a remote home network to the device of the visiting user. The remote home network is in communication with the visited network over a wide area network. Connecting to a virtual gateway controller of the remote home network to obtain configuration information to establish a connection between the device and the remote home network. Establishing a connection between the device of the visiting user and a second access point. Providing access to the resource of the remote home network through the second access point.

14 Claims, 6 Drawing Sheets

(51) Int. Cl.
*H04W 12/06* (2009.01)
*H04L 29/06* (2006.01)
H04W 84/12 (2009.01)
H04L 12/70 (2013.01)

(56) References Cited

U.S. PATENT DOCUMENTS

| | | | |
|---|---|---|---|
| 7,675,923 B2 | 3/2010 | Rossi et al. | |
| 7,729,365 B2 | 6/2010 | Motegi et al. | |
| 7,801,039 B2 | 9/2010 | Monette et al. | |
| 7,802,286 B2 | 9/2010 | Brooks et al. | |
| 7,830,821 B2 | 11/2010 | Lin et al. | |
| 7,969,975 B2 | 6/2011 | Jiang et al. | |
| 8,045,570 B2 | 10/2011 | Allan et al. | |
| 8,230,050 B1 | 7/2012 | Brandwine et al. | |
| 8,326,873 B2 | 12/2012 | Ellis et al. | |
| 8,578,003 B2 * | 11/2013 | Brandwine et al. | 709/220 |
| 8,588,194 B2 | 11/2013 | Chen | |
| 8,626,846 B2 | 1/2014 | Coppens et al. | |
| 8,645,577 B2 * | 2/2014 | Maeng et al. | 709/249 |
| 2004/0117339 A1 | 6/2004 | Thubert et al. | |
| 2004/0148439 A1 | 7/2004 | Harvey et al. | |
| 2005/0020265 A1 | 1/2005 | Funabiki et al. | |
| 2005/0086371 A1 | 4/2005 | Jung | |
| 2005/0132061 A1 | 6/2005 | T'Joens et al. | |
| 2005/0159149 A1 | 7/2005 | Wen et al. | |
| 2005/0185607 A1 | 8/2005 | Svensson et al. | |
| 2006/0120386 A1 | 6/2006 | Rossi et al. | |
| 2006/0184645 A1 | 8/2006 | Monette et al. | |
| 2006/0224701 A1 | 10/2006 | Camp | |
| 2007/0064653 A1 | 3/2007 | Jang et al. | |
| 2007/0160050 A1 | 7/2007 | Wang | |
| 2007/0201508 A1 | 8/2007 | Blackford et al. | |
| 2007/0217436 A1 * | 9/2007 | Markley et al. | 370/401 |
| 2008/0013554 A1 | 1/2008 | Motegi et al. | |
| 2008/0181240 A1 | 7/2008 | Jiang et al. | |
| 2008/0192695 A1 | 8/2008 | Krishnan et al. | |
| 2008/0256458 A1 * | 10/2008 | Aldred et al. | 715/741 |
| 2008/0267215 A1 | 10/2008 | Blackburn et al. | |
| 2008/0316974 A1 | 12/2008 | Krishnan et al. | |
| 2009/0047016 A1 | 2/2009 | Bernard et al. | |
| 2009/0047945 A1 | 2/2009 | Zhang et al. | |
| 2009/0055900 A1 | 2/2009 | Gopalasetty et al. | |
| 2009/0135829 A1 | 5/2009 | Zheng | |
| 2009/0199040 A1 | 8/2009 | Liu et al. | |
| 2010/0080238 A1 * | 4/2010 | Allan et al. | 370/401 |
| 2010/0186079 A1 | 7/2010 | Nice et al. | |
| 2011/0026930 A1 | 2/2011 | Cui et al. | |
| 2011/0040858 A1 | 2/2011 | Gum | |
| 2011/0235549 A1 * | 9/2011 | Ahlers et al. | 370/255 |
| 2012/0052857 A1 | 3/2012 | Kumar et al. | |
| 2012/0087235 A1 | 4/2012 | Smith et al. | |
| 2012/0189016 A1 | 7/2012 | Bakker et al. | |
| 2012/0311108 A1 | 12/2012 | Brandwine et al. | |
| 2012/0314617 A1 | 12/2012 | Erichsen et al. | |
| 2012/0320736 A1 | 12/2012 | Hillier et al. | |

OTHER PUBLICATIONS

Non-Final Office Action, U.S. Appl. No. 13/271,056, dated Mar. 11, 2013, 16 pages.
Final Office Action, U.S. Appl. No. 13/271,047, dated Jul. 17, 2013, 20 pages.
Final Office Action, U.S. Appl. No. 13/271,056, dated Aug. 22, 2013, 17 pages.
Notice of Allowance, U.S. Appl. No. 13/271,047, dated Oct. 11, 2013, 17 pages.
Non-Final Office Action, U.S. Appl. No. 13/271,056, dated Jan. 27, 2014, 18 pages.
Notice of Allowance, U.S. Appl. No. 13/271,047, dated Feb. 6, 2014, 7 pages.
Notice of Allowance, U.S. Appl. No. 13/271,056, dated May 13, 2014, 18 pages.
Troan, et al., RFC 3633—IPv6 Prefix Options for Dynamic Host Configuration Protocol (DHCP) version 6, Dec. 2003.
Notice of Allowance, U.S. Appl. No. 13/533,457, dated Jan. 7, 2015, 25 pages.
Non-Final Office Action, U.S. Appl. No. 13/533,457, dated Aug. 27, 2014, 30 pages.

* cited by examiner

ARCHITECTURE FOR VIRTUALIZED HOME IP SERVICE DELIVERY

CROSS-REFERENCE TO RELATED APPLICATIONS

This application is a continuation of U.S. application Ser. No. 13/271,056, filed Oct. 11, 2011. Cross-reference is made to U.S. application Ser. No. 13/271,047, filed Oct. 11, 2011. The cross-referenced application is incorporated herein by reference.

FIELD OF THE INVENTION

The embodiments of the invention are related to sharing Internet access with visiting user devices. Specifically, the embodiments of the invention relate to a method and system for enabling access to resources from a remote home network for a user device visiting another home network.

BACKGROUND

Home networks are utilized to connect devices in the home to one another and to the Internet. These home networks are connected to residential Internet service providers via a device known as a Residential Gateway (RGW). This device provides physical and protocol connectivity between the home network and the access network (i.e., the core network of the Internet service provider including the Internet service provider's access control devices such as a Broadband Remote Access Server (BRAS) router or Broadband Network Gateway (BNG)).

The RGW can provide bridging or routing support for the home network. It typically also provides additional services such as firewall protection and network address translation. The RGW can connect with the devices in the home using both wired and wireless protocols and connections. The RGW can provide a set of Ethernet connections as well as a wireless local area network using IEEE 802.11(a/b/g/n). The RGW can also be a point of service delivery for services such as Voice Over Internet Protocol (VOIP) or de-multiplexing for services like shared television delivery.

In some situations a home network can have more than one router attached. These additional routers form a hierarchy or tree with the RGW forming the base or root. While the preferred architecture is to avoid such routers, it is helpful for Internet service providers to have visibility for devices within such home network topologies when they are used. However, the addresses of devices connected to routers in these topologies is hidden due to the routers closest to the devices configuring the IP address for the device instead of the RGW.

When an individual visits the home of another individual, the individual may desire to connect a computing device to the home network. The RGW or other router in the visited network must provide a guest network access point such as a wireless service set identifier (SSID) or must provide a password or direct access to the network, which diminishes the security of the visited network. In either case, the visiting user does not have access to the resources of the user's own home network without the use of specialized software such as Virtual Private Network software, which the visited network must be configured to allow. These home network resources can be printers, network storage, media servers and similar network resources. The resources can also be services of the Internet service provider for the home network such as quality of service levels, video streaming services, VOIP services, shared television delivery and similar services.

SUMMARY

A method implemented by a network element of an Internet service provider to provide network access through a visited network associated with a visited network owner to a device of a visiting user connecting to the visited networker, wherein the visited network owner is a customer of the Internet service provider, wherein the network element configures the visited network to provide access to resources of a remote home network to the device of the visiting user, wherein the remote home network is in communication with the visited network over a wide area network, the method comprising the steps of receiving a connection request through a first access point of the visited network from the device of the visiting user, establishing the connection between the visited network and the device of the visiting user through the first access point, receiving a request from the device of the visiting user to connect to a resource of the remote home network through the first access point; connecting to a virtual gateway controller of the remote home network to obtain configuration information to establish a connection between the device and the remote home network; configuring a second access point on the visited network, the second access point for connecting to resources of the remote home network, establishing a connection between the device of the visiting user and the second access point, facilitating authentication of the device for the remote home network, and providing access to the resource of the remote home network through the second access point.

A network element of an Internet service provider to provide network access through a visited network associated with a visited network owner to a device of a visiting user visiting the visited network of the visited network owner, wherein the visited network owner is a customer of the Internet service provider, wherein the network element configures the visited network of the visited network owner to provide access to resources of a remote home network to the device of the visiting user, wherein the remote home network is in communication with the visited network over a wide area network, the network element comprising a network processor to execute a virtual gateway controller and Internet services router, the Internet services router to forward data traffic to and from the visited network, the virtual gateway controller communicatively coupled to the Internet services router and in communication with the visited network through a residential gateway, the virtual gateway controller to manage configuration of the visited network, the virtual gateway controller including a remote access module to connect the virtual gateway controller to a remote virtual gateway controller of the remote home network to enable access to resources of the remote home network for the device of the visiting user through the visited network by connecting to the remote virtual gateway controller to obtain configuration information to establish a connection between the device and the remote home network, the virtual gateway controller to configure the visited network to provide a separate access point in the visited network for the device to communicate with the remote home network and access resources of the remote home network.

BRIEF DESCRIPTION OF THE DRAWINGS

The present invention is illustrated by way of example, and not by way of limitation, in the figures of the accompanying drawings in which like references indicate similar elements.

It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
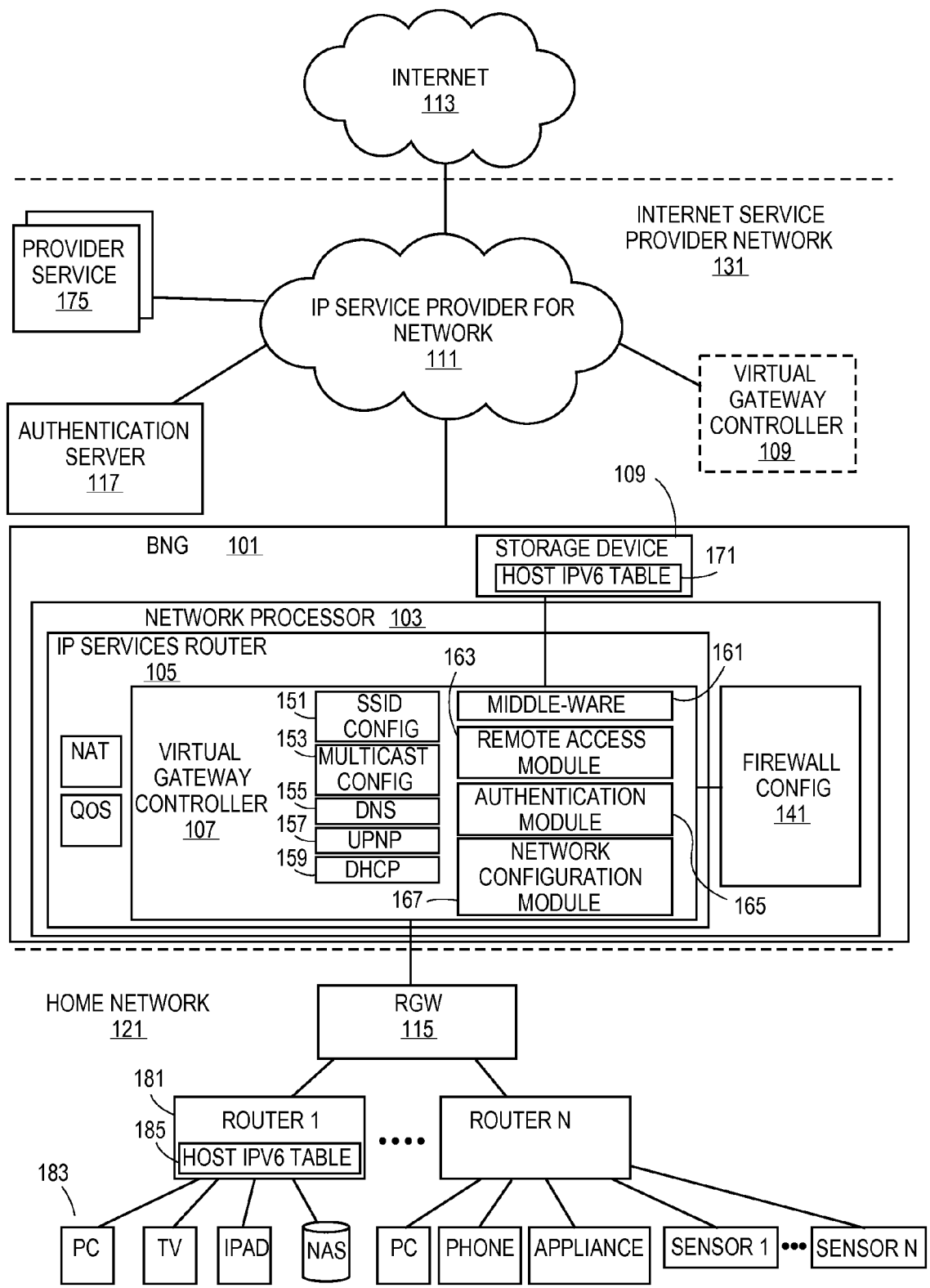
FIG. 1 is a diagram of one embodiment of network implementing virtualized visibility through routers.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1, 2 and 5. However, it should be understood that the operations of the flow diagrams in FIGS. 3 and 6 can be performed by embodiments of the invention other than those discussed with reference to FIGS. 1, 2 and 5, and the embodiments discussed with reference to FIGS. 1, 2 and 5 can perform operations different than those discussed with reference to the flow diagram of FIGS. 3 and 6.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

The embodiments of the invention provide a method and system for avoiding the disadvantages of the prior art. As the needs of home networking have evolved, the demands placed on residential gateway have increased. Thus, the residential gateways have become more complex, error prone, and expensive. Also, to provide new features to customers of an Internet service provider or residential gateway purchaser, it is required that a software upgrade for the residential gateway be performed, which is something that many home users find to be a challenge. This can deter many home users from taking advantage of these new services.

The complexity of properly configuring the residential gateway and other in-home networked devices has increased to the point that many users have serious difficulties getting their home network and attached devices configured. This results in increased support costs for the Internet service providers and residential gateway manufacturers.

Even when the residential gateway has limited functionality, such as when the residential gateway functions simply as a bridge, if there are additional routers within the home network attached to the residential gateway, two significant difficulties arise. The first difficulty is that these additional routers need an Internet Protocol version 6 address prefix to use with the subnets (i.e., their own local area networks (LANs)) that they support. The second difficulty is that such routers completely hide any devices on their supported LANs from the upstream routers and the service provider. This makes it difficult for the service provider to provide or monitor certain services to these hidden devices.

There are two choices both with serious difficulties, for giving a visitor access to a home network. The typical practice, because it is easy, is that a visited home network owner simply gives a visitor the information they need to use the home network including information on the type of encryption used and the passcode to connect to the router. This means that the visitor has full access to all of the resources on the visited home network including devices, services, and network configuration. If the visited home network owner is more sophisticated, and the access is wireless, then a separate SSID can be configured for visiting devices to provide a guest network. This is, at best, hard to do. It is particularly complex to provide access to some in-home services (like printers), but not others. And generally, all of the subscriber's upstream bandwidth, at any priority level desired by the visitor, is available to the visiting device.

The embodiments of the invention also encompass the provision of access to home network resources when visiting a network that is provided by an enterprise such as a hotel or restaurant. These types of visited networks can also implement the architecture and processes described herein. The "visited network" as used herein encompasses both visited home or residential networks and visited enterprise or corporate networks. For sake of clarity, the examples provided herein are in the context of the visited network being a home network.

The embodiments of the invention overcome these disadvantages of the prior art. Instead of using a complex residential gateway with many software functions configured by the home user, the embodiments of the invention use a simple residential gateway device which defers all complex processing to the Internet service provider, at an upstream device such as a Broadband Remote Access Server (BRAS) or Broadband Network Gateway (BNG), or other upstream service delivery platform. The embodiments of the invention encompass an architecture and components for delivering this service. The upstream service delivery platform executes a set of control logic functioning as a virtual residential gateway, which provides the services the subscriber wants from the network of the Internet service provider, including leveraging the rest of the Internet for services. The control logic controls both the upstream service delivery platform and the residential gateway.

The network architecture allows sufficient visibility into the home network that the Internet service provider can provide services transparently, as if they were delivered by devices in the home. Instead of configuring individual devices, the home user has a web interface which provides full control over his network environment in a way that is natural and easy to use, as it integrates all of his equipment and provides a common, well structured, access to the service view, rather than needing to worry about how to configure each device. Service upgrades then become a matter of a request on the web page; the Internet service provider can then modify the configuration that is applied to that home network.

In addition, by having virtualized the residential gateway, the same set of services can be provided to users in other locations. Appropriately authenticated remote access to the home network then becomes a natural part of the overall network architecture. Both the home network and the visited network must utilize a virtualized residential controller. The Internet service provider, through a virtual gateway controller, can automatically configure guest service capabilities (e.g., virtual local area networks (VLANs) and SSIDs) in the visited network. The residential gateway is configured by the virtual gateway controller with appropriate quality of service (QoS) and bandwidth limits to service both the visited network and the services of the remote home network provided to the visiting user.

In some embodiments, the visitor's mobile device includes software to interact with the virtual gateway controller of the visited network and/or the virtual gateway controller for the remote home network. Initially, the visiting user's device connects to the guest services access in the visited network. The virtual gateway controller of the visited network connects to and authenticates the visiting user device for the visited network and then connects to and authenticates the visiting user device with a new access point within the visited network for accessing the remote home network resources. In many cases the remote home network is owned by the visiting user. The visiting user's resources from the remote home network could then be used and shared on the visited network. In addition, whether the visitor remains on the guest service or moves to the dedicated service provided by a new access point, the visited network owner can configure either service in advance, or on demand, to manage access to the visited network's resources. In one example, all visitors could be configured to be able to use the visited network owner's printer.

In another example, when Alice, who is visiting Bob, asks to show something on Bob's television from her own device over Bob's network, Bob can be enable that functionality. Bob can either access configuration settings though one of his own devices to enable Alice's device to connect to a television or the virtual gateway controller can message or query Bob through one of his devices to allow requested resource access in response to the virtual gateway controller receiving the request for access from Alice's device.

The provision of services to devices in networks with virtual gateway controllers is affected by address assignment when the in-home routers rely on the use of dynamic host configuration protocol version 6 (DHCPv6) with prefix delegation. The DHCPv6 with prefix delegation provides the in-home routers with configuration information and a set of prefixes to use for devices on the LANs that they support. Prefix delegation is the assignment of a range of IPv6 addresses with a shared prefix (i.e., a leading set of numbers), for example 2001:0db8:85a3:0000:0000:8a2e:0370:xxxx, where xxxx denotes the assignable address range.

In order to give the Internet service provider visibility to the end-devices on the home network, there is an additional flag and an additional behavior incorporated into DHCPv6. The additional behavior is that whenever a router in the home network detects that a new device is present on local LAN of the router, that router sends a notification to the virtual residential controller at the BNG or BRAS. In order to trigger such notifications, there is a flag included in the DHCPv6 address delegation message indicating that these notifications are needed. For consistency, there is also a flag in the DHCPv6 prefix request message indicating that the router is capable of this behavior.

FIG. 1 is a diagram of one embodiment of the network architecture using a virtual residential gateway and supporting virtualized visibility for residential routers. The implementation of the virtualized visibility is divided amongst three primary components, and several related items. The three primary components are the residential gateway (RGW) 115, the upstream IP Service router 105 (i.e., in a BNG 101, BRAS or equivalent), and the virtual gateway controller 107.

A BNG 101 is an IP edge router where bandwidth and Quality of Service (QoS) policies are applied; the functions performed by a BRAS are a superset of those performed by a BNG. A BRAS is a BNG 101 and is the aggregation point for the subscriber traffic. It provides aggregation capabilities (e.g. IP, PPP, Ethernet) between the access network and the core network 111 of the Internet service provider 131. Beyond its aggregation function, the BRAS is also an injection point for policy management and IP QoS in the access network. For sake of clarity, the example of a network using a BNG 101 to implement the IP services router 105 is provided. However, one skilled in the art would understand that a BRAS or similar device could also be used. An Internet service provider network 131 with a single BNG 101 and RGW 115 is also illustrated for sake of clarity. One skilled in the art would understand that a BNG 101 can connect any number of home networks 121 and RGWs 115 to the core network 111 as well as to the general Internet 113. Also, the Internet service provider 131 can include any number of BNG 101 and BRAS or similar devices to connect to the set of home networks 121 and RGWs 115.

A virtual gateway controller 107 can be implemented in multiple fashions. The virtual gateway controller 107 can be part of the control plane of the IP services router 103, which is executed by a network processor 103 of a BNG or similar device. The virtual gateway controller 107 can be delivered on a blade in the chassis of the IP services router 105 (e.g., in a BNG 101), or it can be a separate device 109 connected via network protocols (IP) to the IP services router 107. This device is responsible for maintaining the subscribers' virtual operation state. This includes determining the operational state of all data plane functions. This means both modeling the state and configuring the appropriate devices such as the RGW 10 and BNG 101 to deliver the behavior needed.

Thus, the virtual gateway controller 107 is responsible for configuring firewall functions 141 on the BNG 101. It is responsible for configuring SSIDs 151 and their policies for wireless access on the RGW 115. It is responsible for managing multicast filters 153 on both devices so as to provide needed connectivity while reducing unnecessary traffic. The virtual gateway controller 107 can also provide house control functions such as a UPnP controller 157. It can provide supporting services such as creating DNS entries 155. The operation of the virtual gateway controller is tied in to the existing authorization infrastructure 117 used by the Internet service provider (e.g., RADIUS and/or Diameter.) This enables additional authorization operations, such as those needed for Fixed-Mobile Convergence, or for support of SIM based residential gateways.

The IP services router 105 is the router which delivers data plane services for the subscriber. It handles all subscriber data plane packets. It performs many of the functions, such as network address translation (NAT) and firewall functions, which are functions that are traditionally delivered by the RGW 115. The operation of these functions is controlled by the virtual gateway controller 107. This device also performs data plane functions such as traffic policing and QoS delivery, which are currently delivered on such platforms. However, in this embodiment the operation of such functions is under the control of the virtual gateway controller, although per-subscriber base operations can be delegated to the IP services router 105. The IP services router 105 or a suitable controller for this device, participates in the IP routing of the operator's IP network, and is able to send and receive traffic on behalf of the subscriber.

The residential gateway 115 provides the physical connectivity between the various media in the home (Ethernet, 802.11b/g/n Wifi, Zigbee, and similar media) and connectivity to the service provider (DSL, Cable, Passive Optical, LTE, and similar technologies). The residential gateway 115 provides enough logical operation that it can provide packet communication between the devices in the home and the IP service providers network. This device can be owned by either the subscriber or the operator. However, it is controlled by the virtual gateway controller 107 managed by the operator.

Other devices in the home network 121 can use protocols that interact with the virtual gateway controller. In general, this interaction is unchanged within the home network device; however the shift of the functionality from the RGW to the virtual gateway controller improves the manageability and effectiveness of operation. For example, a device on the home network 121 can use universal plug and play protocol (UPnP) 157 to reach the virtual gateway controller or to discover a storage service on the home network 121, which previously was entirely implemented within the home network 121. With the use of the virtual gateway controller, UPnP 157 and other services including the domain name service 155, DHCP 159, SSID configuration 151, multicast configuration 153 and similar services appear to be implemented in the home network 121 or at the RGW, but are actually deliverable by the Internet service operator from BNG 101 through the virtual gateway controller 107 or similar devices in the Internet service provider network 131. The use of the split architecture where the control plane of the virtual gateway controller is separated from the data plane of the RGW makes the services of the Internet service provider network 131 appear easily discoverable and transparently accessible to the user. Such services can include voice-over-IP (VOIP) enablement services, storage services, or application services. Similarly, access to the home network 121 and home network based services can be more easily provided to users when they are accessing the home network from other networks using additional software for authentication and association, such as an authentication server 117 provided by the Internet service provider.

There are two primary concepts involved in the control operation of the virtual gateway controller 107. The first is the control protocol by which the virtual gateway controller 107 controls the functions of the BNG 101 and RGW 115. This first control protocol can be a protocol such as a modification of the ForCES protocol standardized by the International Engineering Task Force (IETF). The ForCES protocol can be enhanced to represent the needed functions. Other protocols, including traditional network management protocols such as simple network management protocol (SNMP) or NETConf or even computer usage of web-based interactions can be used for this control.

The second primary concept involved in the control operation of the virtual gateway controller 107 is the control protocol by which the virtual gateway controller can be the controlling element for network operation protocols such as DHCP, IPv6 Neighbor Discovery, and UPnP discovery mechanisms.

In some home networks 121, there will be routers 181 that are separate from the residential gateway within the home network 121. These routers 181 can be configured to use DHCPv6 to receive an IPv6 prefix to use for host (i.e., end devices 183) that they are supporting. The additional home network routers 181 that support virtualized visibility will indicate this support by including a flag in their DHCPv6 request message that is sent to the RGW 115 and then forwarded to the virtual gateway controller 107 on the BNG 101. The virtual gateway controller 107 provides DHCPv6 services 159. When responding to routers, which have indicated that they support the virtualized visibility, the virtual gateway controller 107 will set a flag indicating that addresses assigned to new hosts 183 shall be reported to the virtual gateway controller 107 as they are discovered.

The home network routers 181 supporting the virtualized visibility will monitor and maintain state about hosts 183 that are attached to the home network routers 181 on their LANs. The LANs provided by these home network routers 181 can be any combination of wired and wireless LANs. Each router 181 will support virtualized visibility by monitoring IPv6 neighbor discovery requests and IPv6 DHCPv6 requests that they relay. When a new host 183 is discovered, a notification message is sent by the router 181 to the virtual gateway controller 107. When a host 183 is deemed no longer present, a notification is again sent to the virtual gateway controller 107. The virtual gateway controller 107 responds to these notifications with acknowledgement messages. In one embodiment, the notifications are resent until the acknowledgment is received. These messages can be sent using ICMP or other control protocol. In other embodiments UDP or a protocol over a TCP connection to the virtual gateway controller could be used. Whenever such a message is sent, all unacknowledged information can be included in the message for efficiency.

Host removal can be detected when stateless address autoconfiguration (SLAAC) is used by having a revalidation time and a lifetime on the entries that the home network router stores about its hosts. This information can be stored in a host IPv6 table 185 or similar data structure. When the revalidation time is reached, the home network router 181 will send IPv6 neighbor solicitation messages to verify the continued existence of the host 183 on the LAN and then will set new time limits. In the event that the host 183 fails to respond, the home network router 181 will resend the message. After several retransmissions of the message, the router 181 will declare the host 183 removed, and will notify the virtual gateway controller 107. The virtual gateway controller 107 can track the hosts 183 in a home network in a host IPv6 table 109. A separate instance of the table can be maintained for each connected home network or assigned prefix.

If a home network router supports other mediums of communications with other host notification protocols, such as 6LowPan, then the procedures from those media can be used to detect the presence of hosts 183 and determine the information needed for the registration with the virtual gateway controller 107. The hosts 183 can be any type of networked device such as personal computers, televisions, handheld devices such as tablet computers and cellular phones, network storage devices, appliances and similar devices. In one embodiment, the home network 121 can also support machine to machine communication. Machine to machine communication can be used to collect data from a set of sensors connected to the home network router 181. Middleware 161 that communicates with sensors and devices using machine to machine communication is typically executed by a residential gateway, but can also be moved to the virtual gateway controller.

This network architecture provides a coherent system for a virtualized residential gateway and virtualized home service delivery. The configuration, enhancement, and consistent remote service and remote access to home information and resources all become natural parts of a coherent architecture. An important advantage of this architecture is to provide the operator enough visibility to all devices connected to the residential gateway in the home network 121. This enables the Internet service provider to provide different (seamless) services to the home, e.g., network management, service delivery, and similar services. Another advantage is to enable the Internet service provider to assist 3rd parties, e.g., utility providers or appliance manufacturers, in accessing the right devices through the home network 121. For example, an electric utility company may need to access the home network 121 to configure the thermostat or switch on/off a particular device in the electrical system of the home. In one embodiment, this can be done through the machine to machine middleware 161 or an instance thereof.

In one embodiment, the virtual gateway controller 107 also includes a remote access module 163, an authentication module 165, a network configuration module 167 and similar components. The components facilitate the management of the home network 121 by the owner of the home network or any user associated with an account of the owner of the home network. For sake of clarity, a home network owner refers to any individual with administrative authority for the home network 121. A home network user refers to an individual using a computing device or host 183 connected to the home network 121.

The remote access module 163 provides access to resources from remote home networks to visiting user devices. The remote access module 163 can establish a separate virtual local area network (VLAN) or SSID for providing access to the remote network resources. The remote access module 163 can also communicate with a virtual gateway controller of the remote home network to obtain configuration information for the remote home network and the information needed to access resources on the remote home network. The remote access module 163 can work with the authentication module 165 to authenticate visiting user devices on the home network 121 to enable the visiting user devices to access resources of the home network 121. The authentication module 165 can also facilitate the authentication of the visiting user device for establishing a connection to the remote home network. The function of these modules is discussed in further detail herein below in regard to FIGS. 5 and 6.

The network configuration module 167 can provide a user interface to enable a home network owner to alter the configuration of the home network. The network configuration module 167 can provide a web-based interface, can interact with a local client of host devices 183 or similarly enable the home network owner to access the configuration interface. In instances where visiting users are requesting to access or share local or remote home network resources, the home network owner can be notified of the request and enabled to approve or refuse the request using an interface provided by the network configuration module 167.

Figure 2:
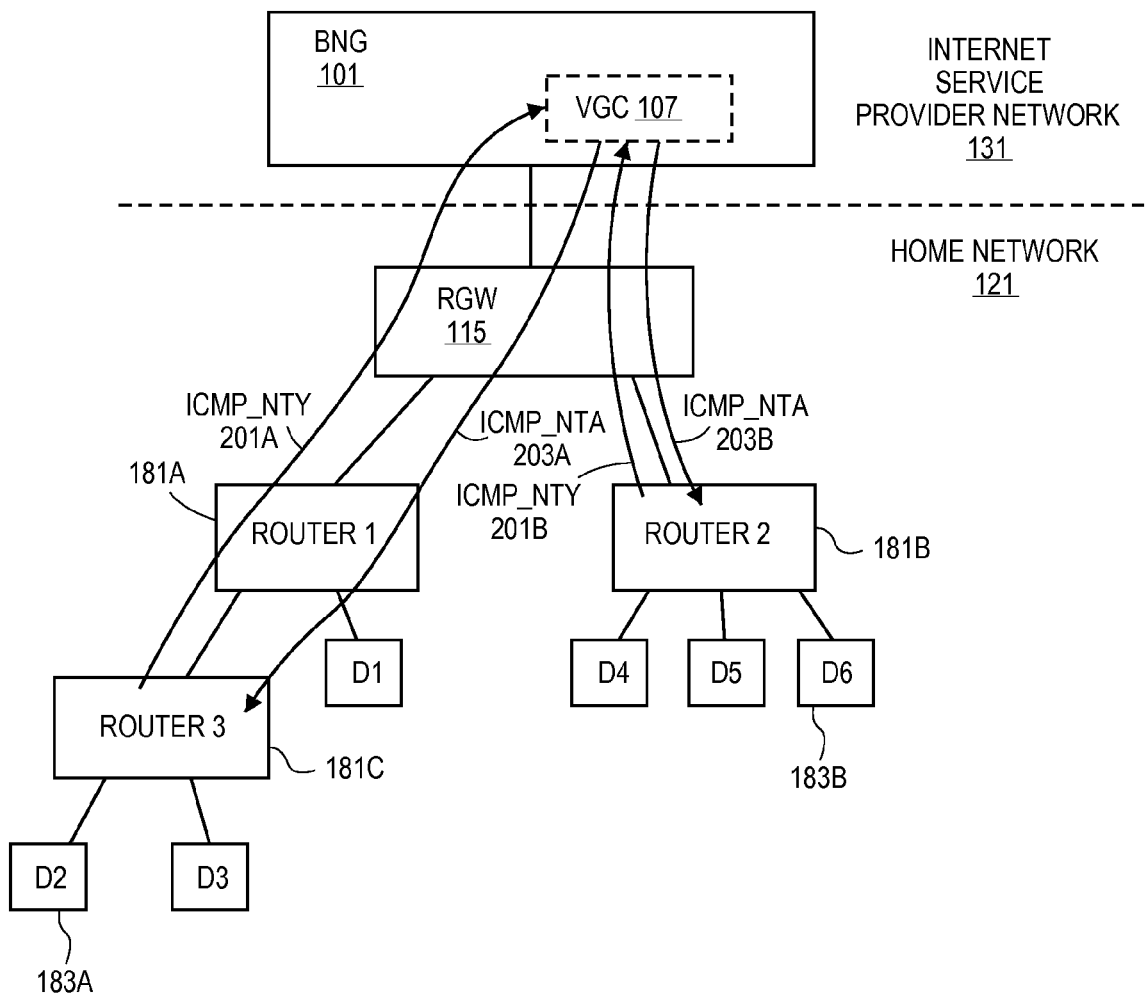
FIG. 2 is a diagram of one embodiment of messaging between home network routers and a virtual gateway controller.

FIG. 2 is a diagram of one embodiment of messaging between home network routers and a virtual gateway controller. In the example embodiment, the home network 121 is connected to a BNG 101 providing a virtual gateway controller (VGC) 107. In other embodiments, the virtual gateway controller 107 can be located external to the BNG 101 within the Internet service provider network 131. The home network 121 includes a residential gateway (RGW) 115 and a set of home network routers 181A-C. The home network routers 181A and 181C are in a nested or cascaded configuration. This creates multiple levels of indirection between the VGS 107, which provides DHCP services for the home network 121 and the host (i.e., end devices), such as host 183A. The diagram provides an example of the host 183A being discovered by the home network router 181C.

In this example, the home network router 181C has already been provided with a prefix by the DHCP services of the VGC 107 indirectly through a DHCPv6 prefix request sent to the intermediate home network router 181A. The DHCPv6 prefix request included a flag or similar indicator of the support for virtualized visibility. This DHCPv6 prefix request was forwarded by the intermediate router 181A, which then forwarded it to the VGC over the RGW, which in this architecture as described above, functions as a bridge. The VGC then responded with the assigned prefix or a subset of the prefix assigned to the intermediate home network router 181A using a DHCPv6 message indicated that notifications were required for discovered hosts. The intermediate home network router 181A then recorded this address range or prefix and forwarded the message to the requesting home network router 181C.

The host 183A can be discovered using any type of neighbor discovery protocol. Once discovered, the home network router 181C provides the host 183A with an IPv6 address based upon the prefix assigned to the router 181C by the DHCPv6 service of the VGC 107. However, this newly assigned IPv6 address would be unknown to the VGC 107, except that the VGC 107 has required notifications of new host discovery. The notification can be in the form of an ICMP message or similar type of control protocol message. In one embodiment, the home network router generates a notification message referred to as an ICMP_NTY message 201A. The ICMP_NTY message 201A can include the assigned IPv6 address for the host 183A, a MAC address for the host 183A, lifetime or license expiration data and similar information to enable the VGC 107 to track the host 183A. The intermediate home network router 181A and the VGC 107 record this information in the host IPv6 tables.

The VGC 107 then generates an acknowledgement message. The acknowledgement message can be an ICMP message. The ICMP message can be a notification acknowledgement message referred to herein as an ICMP_NTA message 203A. The ICMP_NTA message 203A is sent to the intermediate home network router 181A where it is forwarded to the home network router 181C. The home network router 181C would continue to resend the ICMP_NTY message 201A until the ICMP_NTA message 203A is received in return.

Similarly, a simpler scenario is provided where a third home network router 181B discovers a host 183B. In this case, the same type of ICMP_NTY 201B and ICMP_NTA 203B messages are exchanged by the home network router 181B and the VGC 107 without the involvement of any intermediate router. The process of notification thus can involve any number of home network routers in any arrangement including any hierarchical depth of cascading routers.

Figure 3:
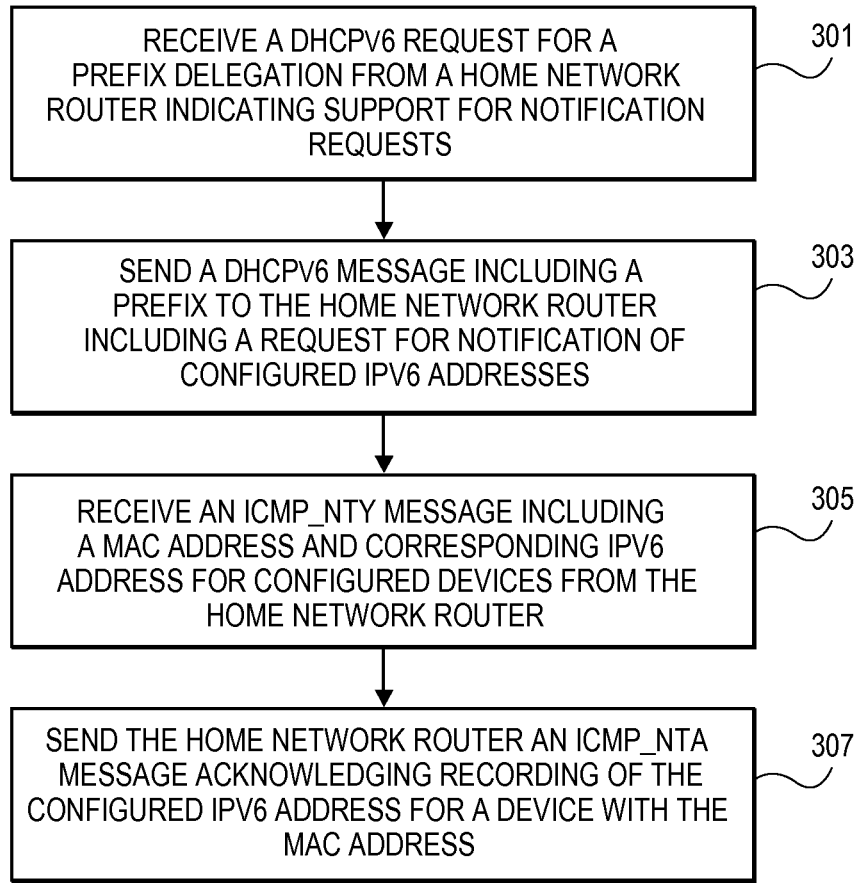
FIG. 3 is a flowchart of one embodiment of a process for enabling virtualized visibility through residential routers.

FIG. 3 is a flowchart of one embodiment of a process for enabling virtualized visibility through residential routers. The illustrated process sets forth the actions taken by the virtual gateway controller to implement the virtualized visibility system. In one embodiment, the process is initiated in resposponse to receiveing a DHCPv6 request for a prefix delegation from a home network router (Block 301). The request can include an indicator such as a flag or set field that denotes the support for the virtualized visibility system.

The VGC responds to the received request by sending a DHCPv6 message including an assigned prefix to the home network router (Block 303). The response message can include an indicator in the form of a flag or a set field that indicates that notifications of host discovery or IPv6 address configuration are required to be reported to the VGC. This message can be sent to the requesting home network router through the residential gateway and any number of intermediate home network routers.

The process can further receive an ICMP_NTY notification message from the home network router at any time, in response to the home network router discovering a host and configuring an IPv6 address for the host (Block 305). The ICMP_NTY message can include the IPv6 address of the host, a MAC address for the host, a lifetime or license expiration and similar information about the host IPv6 configuration. This information can be recorded in a host IPv6 table to facilitate data plane forwarding and service provision to the host. The VGC then generates and sends an ICMP_NTA message to the home network router (Block 307). The ICMP_NTA message acknowledges receipt and recording of the data from the ICMP_NTA message including the IPv6 address and MAC address for the host.

Figure 4:
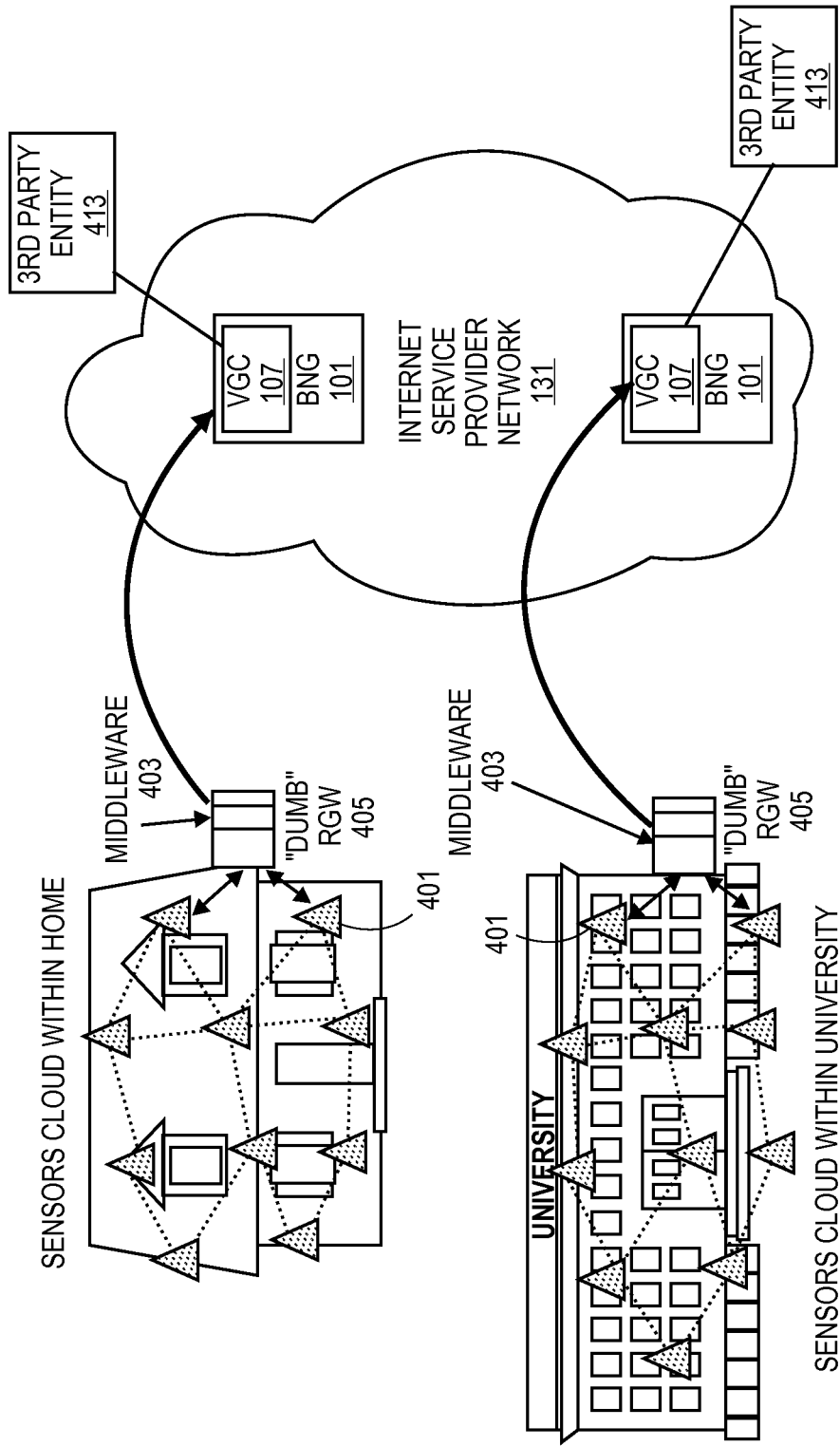
FIG. 4 is a diagram of one embodiment of the architecture for a machine to machine system interfacing a virtual gateway controller.

FIG. 4 is a diagram of one embodiment of the architecture for a machine to machine system interfacing a virtual gateway controller. In one embodiment, the virtual gateway controller 107 includes or supports the middleware 403 that enables communication or collects data from sensors 401 within a home using machine to machine communication or a machine to machine communication network. The middleware 403 that had traditionally been executed by the residential gateway 405 has been moved to the virtual gateway controller 107. The process for visibility and the general function of the network as described above can also be applied to support these machine to machine networks with a virtual gateway controller taking the place of the function of the RGW in these systems.

The middleware 405 can continue to communicate with third party entities 413. This function is enhanced in terms of security and flexibility with the virtual gateway controller 107. The virtual gateway controller 107 can provide access to the middleware 405 and thereby the sensor network in the home without giving the third pary entities actual access to the home network or RGW. Separate instances of the middleware 405 can be provided for separate third party accesses.

Figure 5:
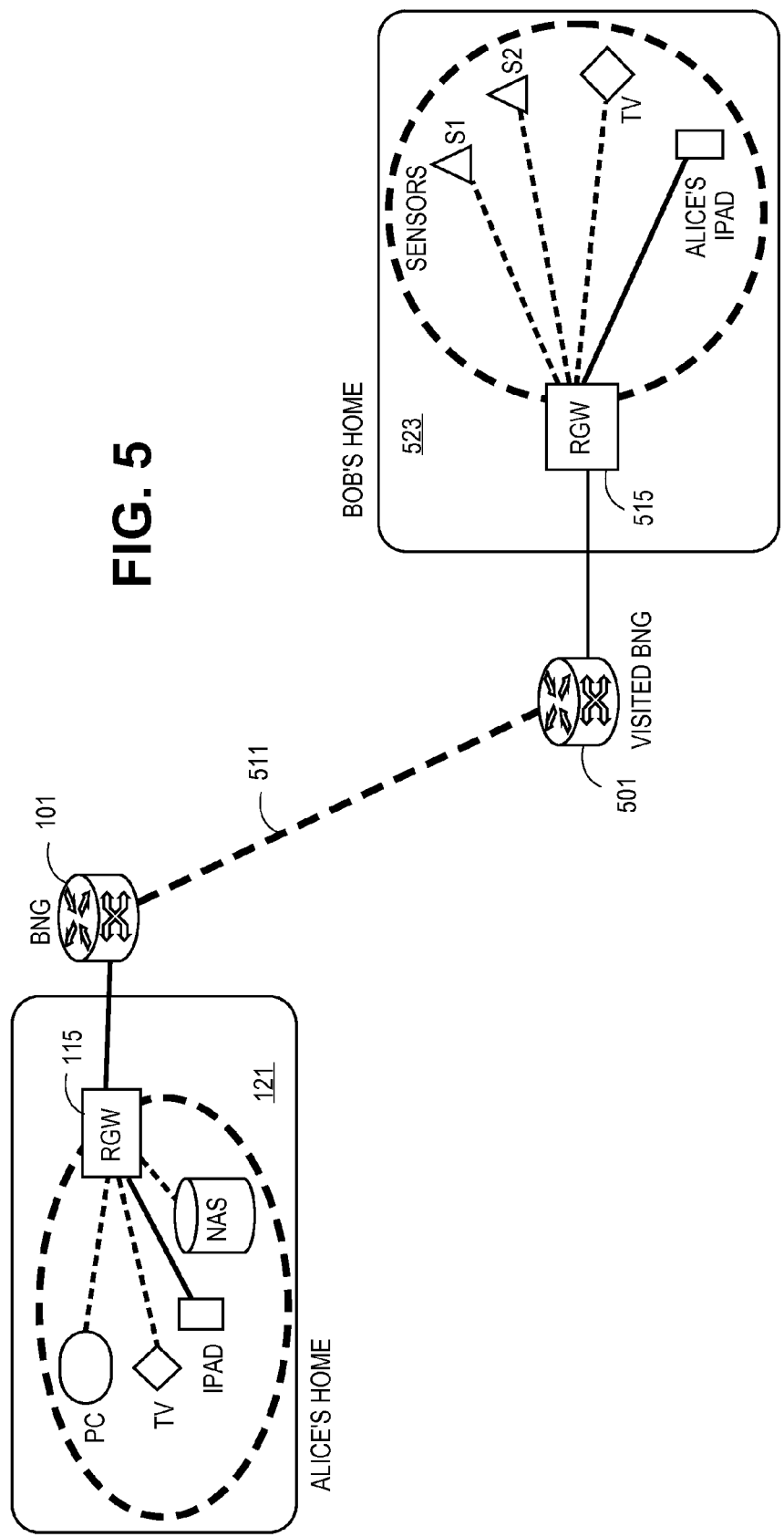
FIG. 5 is a diagram of one embodiment of a remote home network and a visited network.

FIG. 5 is a diagram of one embodiment of a remote home network and a visited network. The remote home network 121 is owned or controlled in this example by 'Alice.' The remote home network 121 can include any number of hosts such as personal computers, televisions, handheld devices, network storage (NAS) and similar hosts. The remote home network 121 can also receive any number of services from the virtual gateway controller on the BNG 101. The virtual gateway controller can provide any number of services as discussed above in regard to FIG. 1. The BNG 101 can be part of the same Internet provider network or a separate Internet provider network as the BNG 501 that services the visited network 523. A remote access module of each virtual gateway controller establishes the connection between the two BNGs 101, 501 to enable the remote accessing of resources when the owner or device of one home network visits another home network that supports the remote access service.

The visited network 523 can be any type of home or enterprise network including a wired and/or wireless network in a residence or business setting. The visited network 523 can include a set of host devices including personal computers, televisions, sensors, network storage, printers and any other type of network resource. In the illustrated example, the visited network 523 is owned by 'Bob.' The illustrated example shows Alice connecting to Bob's visited network 523 using a handheld device. The handheld device can connect to the residential gateway 515 using either a wired connection or a wireless connection. The residential gateway 515 is controlled and configured by a virtual gateway controller in the BNG 501. The function of the virtual gateway controller in handling the connection of the visiting handheld device of Alice is described further below in regard to FIG. 6. The visiting handheld device of Alice (or any visiting device) can include software that is specifically designed to connect to the virtual gateway controller of the visited network and the remote gateway controller of the remote home network. This software can directly negotiate the access to resources on the visited network and the remote home network when not directly connected to the remote home network.

Figure 6:
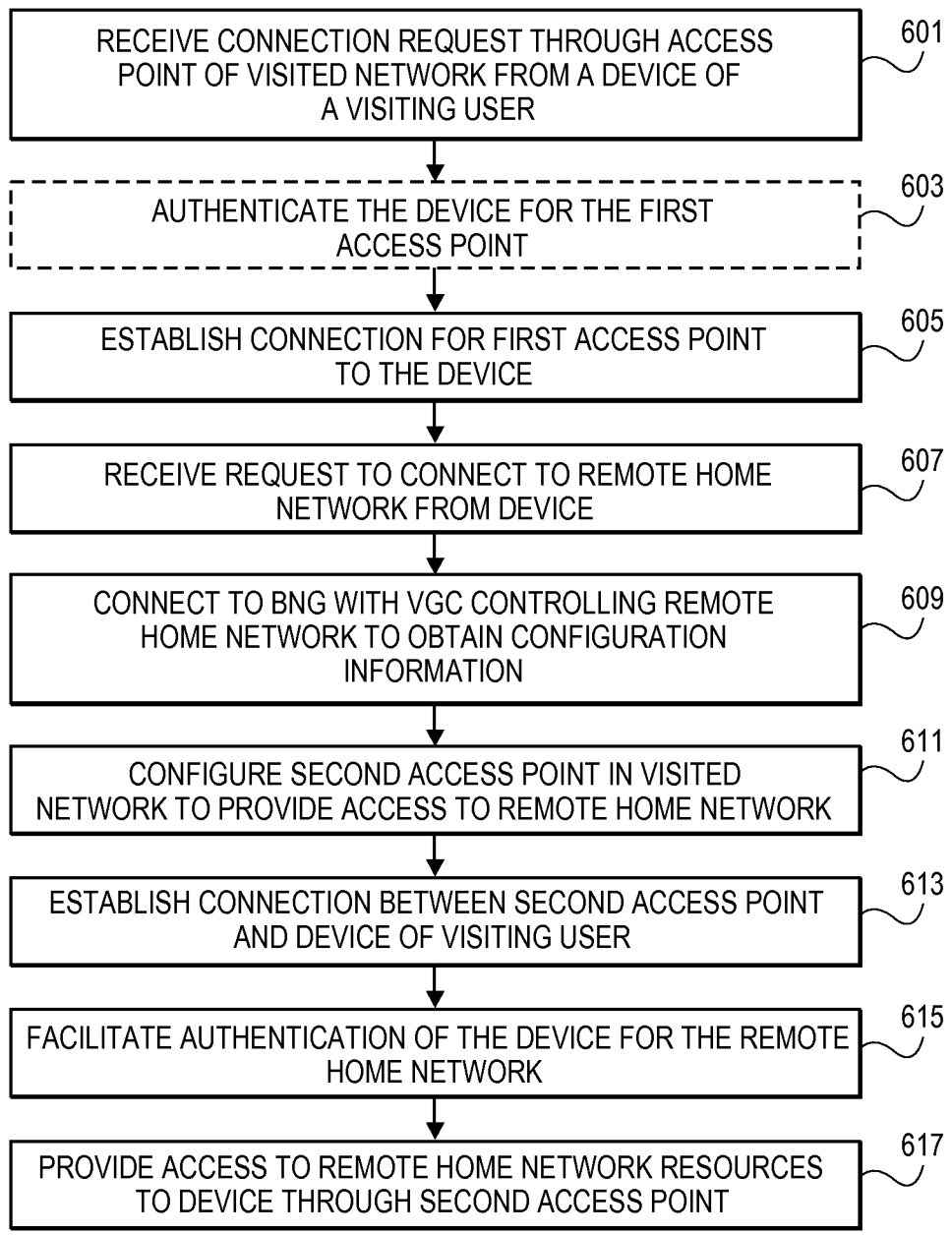
FIG. 6 is a flowchart of one embodiment of a process for enabling access to remote home network resources.

FIG. 6 is a flowchart of one embodiment of a process for enabling access to remote home network resources. The process is described in relation to the simplified example architecture of FIG. 5 where a user device is connecting to the home network of another user. In one embodiment, the process is initiated in response to a virtual gateway controller receving a connection request through an access point of a visited network from a device of a visiting user (Block 601). The access point can be a residential gateway offering a wireless access point or a direct wired connection. The access point can also be another residential router within the visited network that passes the connection request to the virtual gateway controller through the residential gateway. The connection request can be associated with a wired LAN of the visited network, a protected wireless LAN, a guest wireless LAN or similar LAN within the visited network. The access point connections to the visited network and the remote home network can be SSIDs or VLANs.

The authentication module of the virtual gateway controller managing the visited network can authenticate the device of the visiting user for the visited network (Block 603). Authentication of the device can grant any level of access to the resources of the visited network dependent on the configuration of the visited network by the home network owner of the visited network. In other embodiments, the visited network does not require any authentication for use of the resources of the visited network.

The virtual gateway controller establishes a connection between the device of the visiting user and the visited network through the first access point (Block 605). The level of access to resources through the connection is dependent on the level of access granted by the visited network owner. The visiting user can then request a connection with the remote home network of the visiting user, where the visiting user is the home network owner or user of that remote home network (Block 607). The connection request can be for a specific resource of the remote home network or a general request to connect to the remote home network.

The remote access module of the virtual gateway of the visited network processes this request and connects the BNG and the virtual gateway controller of the visited network with the virtual gateway controller of the remote home network to obtain configuration information for the remote home network (Block 609). The configuration information can include a definition of the services of the owner of the remote home network provided by the Internet service provider for the remote home network. The remote access module of the visited network can then adjust the configuration of the visited network to provide access to the resources and services of the remote home network to the visiting device.

The remote access module can either provide the remote home network resources via the first access point or can configure a new second access point that is dedicated to the provision of these resources to the visiting device (Block 611). When the second access point is created, the remote access module can automatically transition the visiting device to the second access point or grant access to the second access point for the visiting device to use both access points (Block 613). The authentication module of the visited network can then facilitate the authentication of the visiting device by either authenticating the visiting device based on configuration information provided by the virtual gateway controller of the remote home network or by exchanging authentication information from the visiting device with the virtual gateway controller of the remote home network (Block 615). In one embodiment, the second access point and the associated SSID or VLAN can be shared by multiple visiting devices with similar access rights for the remote home network. For example, a family may be visiting where each member of the family has a separate device and each can access the remote home network resources though the second access point.

Once the visiting device is authenticated for the access of resources from the remote home network, then the visiting device is connected through the second access point and can access the resources of the remote home network (Block 617). In some embodiments, the owner of the visited network configures a level of access to remote home network resources using the network configuration interface. The owner of the visited network can also be prompted for each new type of access after the initial connection is allowed to the visiting device. The level of control or interaction required for the owner can be configured through the network configuration interface.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network element of an Internet service provider executing a virtual gateway controller of a visited network at a Broadband Network Gateway (BNG) of the visited network to provide network access through the visited network associated with a visited network owner to a device of a visiting user connecting to the visited network, wherein the visited network owner is a customer of the Internet service provider, wherein the network element configures the visited network to provide access to resources of a remote home network to the device of the visiting user, wherein the remote home network is in communication with the visited network over a wide area network and the remote home network is configured by a virtual gateway controller of the remote home network executed at a BNG of the remote home network, the method comprising the steps of:
   receiving a connection request through a first access point of the visited network from the device of the visiting user;
   establishing the connection between the visited network and the device of the visiting user through the first access point;
   receiving a request from the device of the visiting user to connect to a resource of the remote home network through the first access point;
   connecting the virtual gateway controller of the visited network to the virtual gateway controller of the remote home network to obtain configuration information to establish a connection between the device and the remote home network;
   configuring a second access point on the visited network, the second access point for connecting to resources of the remote home network;
   establishing a connection between the device of the visiting user and the second access point;
   facilitating authentication of the device for the remote home network; and
   providing access to the resource of the remote home network through the second access point.

2. The method of claim 1, further comprising the step of: authenticating the device for the visited network.

3. The method of claim 1, wherein the second access point is any one of a virtual local area network port and a service set identifier (SSID) of a wireless local area network.

4. The method of claim 1, further comprising the step of: establishing a virtual local area network connection between the virtual gateway controller of the remote home network and the device on the visited network.

5. The method of claim 1, further comprising the step of: providing access to a resource on the visited network to the device in response to approval of the visited network owner through a network configuration interface of the visited network.

6. The method of claim 5, further comprising the step of: querying, through the network configuration interface, the visited network owner of the visited network for approval in response to a resource request of the device.

7. The method of claim 1, wherein the first access point is a guest network of the visited network.

8. A network element of an Internet service provider executing a virtual gateway controller of a visited network at a Broadband Network Gateway (BNG) of the visited network to provide network access through the visited network associated with a visited network owner to a device of a visiting user visiting the visited network of the visited network owner, wherein the visited network owner is a customer of the Internet service provider, wherein the network element configures the visited network of the visited network owner to provide access to resources of a remote home network to the device of the visiting user, wherein the remote home network is in communication with the visited network over a wide area network and the remote home network is configured by a virtual gateway controller of the remote home network executed at a BNG of the remote home network, the network element comprising:
- a network processor to execute the virtual gateway controller of the visited network and Internet services router,
  - the Internet services router to forward data traffic to and from the visited network,
  - the virtual gateway controller of the visited network communicatively coupled to the Internet services router and in communication with the visited network through a residential gateway, the virtual gateway controller of the visited network to manage configuration of the visited network, the virtual gateway controller of the visited network including a remote access module to connect the virtual gateway controller of the visited network to the virtual gateway controller of the remote home network to enable access to resources of the remote home network for the device of the visiting user through the visited network by connecting to the virtual gateway controller of the remote home network to obtain configuration information to establish a connection between the device and the remote home network, the virtual gateway controller of the visited network to configure the visited network to provide a separate access point in the visited network for the device to communicate with the remote home network and access resources of the remote home network.

9. The network element of claim 8, wherein the virtual gateway controller of the visited network further comprises:
- an authentication module to authenticate the device for the visited network.

10. The network element of claim 8, wherein the virtual gateway controller of the visited network configures the separate access point as any one of a virtual local area network port and a service set identifier (SSID) of a wireless local area network.

11. The network element of claim 8, wherein the remote access module is configured to establish a virtual local area network connection between the virtual gateway of the remote home network and the device on the visited network.

12. The network element of claim 8, further comprising:
- a network configuration module configured to manage access to a resource on the visited network by the device in response to approval of the visited network owner.

13. The network element of claim 12, further comprising:
- a network configuration module configured to query the visited network owner for approval in response to a resource request of the device through a network configuration interface.

14. The network element of claim 8, wherein the first access point is a guest network of the visited network.

* * * * *

UNITED STATES PATENT AND TRADEMARK OFFICE
CERTIFICATE OF CORRECTION

| | |
|---|---|
| PATENT NO. | : 9,154,378 B2 |
| APPLICATION NO. | : 14/293803 |
| DATED | : October 6, 2015 |
| INVENTOR(S) | : Haddad et al. |

It is certified that error appears in the above-identified patent and that said Letters Patent is hereby corrected as shown below:

IN THE DRAWINGS

In Fig. 1, Sheet 1 of 6, delete "PROVIDER SERVICE 175" and insert -- SERVICE PROVIDER 175 --, therefor.

In Fig. 1, Sheet 1 of 6, delete "VIRTUAL GATEWAY CONTROLLER 109" and insert -- VIRTUAL GATEWAY CONTROLLER 107 --, therefor.

IN THE SPECIFICATION

In Column 1, Line 8, delete "2011." and insert -- 2011, now Pat. No. 8,812,670. --, therefor.

In Column 3, Line 43, delete "Scan" and insert -- 5 can --, therefor.

In Column 6, Line 67, delete "router 103," and insert -- router 105, --, therefor.

In Column 7, Line 5, delete "router 107." and insert -- router 105. --, therefor.

In Column 7, Line 10, delete "RGW 10" and insert -- RGW 115 --, therefor.

In Column 10, Line 40, delete "VGS" and insert -- VGC --, therefor.

In Column 11, Line 33, delete "resposponse to receiveing" and insert -- response to receiving --, therefor.

In Column 12, Line 7, delete "middleware 405" and insert -- middleware 403 --, therefor.

In Column 12, Line 11, delete "middleware 405" and insert -- middleware 403 --, therefor.

Signed and Sealed this
First Day of March, 2016

Michelle K. Lee
*Director of the United States Patent and Trademark Office*

CERTIFICATE OF CORRECTION (continued)
U.S. Pat. No. 9,154,378 B2

IN THE SPECIFICATION

In Column 12, Line 12, delete "pary" and insert -- party --, therefor.

In Column 12, Lines 13-14, delete "middleware 405" and insert -- middleware 403 --, therefor.

In Column 12, Lines 19-20, delete "network storage (NAS)" and insert -- network-attached storage (NAS) --, therefor.